US009415502B2

(12) United States Patent
Thompson

(10) Patent No.: US 9,415,502 B2
(45) Date of Patent: Aug. 16, 2016

(54) MULTI-USE TOOL TABLES

(71) Applicant: Mark Thompson, Wenatchee, WA (US)

(72) Inventor: Mark Thompson, Wenatchee, WA (US)

( * ) Notice: Subject to any disclaimer, the term of this patent is extended or adjusted under 35 U.S.C. 154(b) by 0 days.

(21) Appl. No.: 14/444,662

(22) Filed: Jul. 28, 2014

(65) Prior Publication Data

US 2014/0332657 A1 Nov. 13, 2014

(51) Int. Cl.

*F16M 1/00* (2006.01)
*B25H 1/14* (2006.01)
*B25H 1/02* (2006.01)
*B25H 1/04* (2006.01)

(52) U.S. Cl.

CPC .. *B25H 1/14* (2013.01); *B25H 1/02* (2013.01); *B25H 1/04* (2013.01)

(58) Field of Classification Search

CPC combination set(s) only.
See application file for complete search history.

(56) References Cited

U.S. PATENT DOCUMENTS 1,274,849 A * 8/1918 Bullerdick .............. A01F 25/12 211/125
2,319,025 A 5/1943 Wehringer
2,851,061 A 9/1958 Goodlet
2,937,381 A * 5/1960 Manas ...................... E03C 1/32 248/122.1
3,570,564 A 3/1971 Bergler
3,975,068 A * 8/1976 Speckin ................. A47B 57/26 108/151
4,058,302 A * 11/1977 Barrowcliff .............. G04D 1/06 269/250
4,105,055 A 8/1978 Brenta
4,145,006 A * 3/1979 Webb ....................... B25H 1/00 269/69
4,932,620 A * 6/1990 Foy ........................ F16M 11/08 248/124.1
5,082,037 A * 1/1992 Hammons ................. B60R 9/06 144/286.1
5,141,211 A * 8/1992 Adams, Jr. .............. B60C 25/04 269/16
5,144,898 A * 9/1992 Posly ................... A47B 23/046 108/148
5,165,632 A * 11/1992 Kuan ................... B25H 1/0007 248/129
5,181,681 A * 1/1993 Edwards ............. A47B 23/046 108/106
5,259,601 A * 11/1993 Vass ..................... B25H 1/0007 269/100
5,374,019 A * 12/1994 Fischer ................ A47B 23/046 248/124.1
5,431,206 A 7/1995 McAllister
5,570,641 A 11/1996 Grauglieri
5,735,413 A * 4/1998 Allen ..................... A47B 46/00 211/107
5,890,739 A * 4/1999 Cogswell, Sr. ............ B60R 9/06 224/510
5,906,284 A * 5/1999 Hammerstrom ......... B25H 1/02 211/107
5,924,827 A 7/1999 Mora et al.
5,957,472 A 9/1999 Borgatti
6,237,659 B1 5/2001 Francis
6,240,856 B1 * 6/2001 Paskey ..................... B25H 1/12 108/146

(Continued)

*Primary Examiner* — Monica Millner
(74) *Attorney, Agent, or Firm* — Mohr Intellectual Property Law Solutions, PC

(57) ABSTRACT

Multi-use tool tables configured to support table tools and allow selective rotation of the table tools between an upright position and an inverted position are described in the present application. The multi-use tool tables include: one or more rotatable plates having a first surface for receiving a first tool and a second opposing surface for receiving a second tool, a perimeter edge of the one or more rotatable plates being attached to a rotatable shaft; a column with a first attached to a support mechanism and a second attached to a sleeve, the sleeve being configured to receive the rotatable shaft; and a stop mechanism configured to selectively resist movement of the rotatable shaft within the sleeve. The one or more rotatable plates are rotatable between a first surface upright/second surface inverted position and a second surface upright/first surface inverted position.

20 Claims, 14 Drawing Sheets

(56) References Cited

U.S. PATENT DOCUMENTS

| | | | | |
|---|---|---|---|---|
| 6,345,829 | B1 | 2/2002 | Mueller | |
| 6,749,189 | B1 * | 6/2004 | Wolff | B25H 1/04 269/139 |
| 6,802,265 | B1 * | 10/2004 | Dodson | A47B 23/04 108/1 |
| 6,857,378 | B2 * | 2/2005 | Franze | A47B 9/06 108/146 |
| 6,910,429 | B1 * | 6/2005 | Matay | B25H 3/06 108/152 |
| 6,925,754 | B1 * | 8/2005 | Tearoe | A01G 9/12 172/371 |
| 7,063,311 | B1 * | 6/2006 | Ascolese | B25H 1/18 269/69 |
| 7,089,980 | B2 | 8/2006 | Rulli | |
| 7,648,155 | B1 | 1/2010 | Wise | |
| 8,539,870 | B2 | 9/2013 | Behr | |
| 8,613,454 | B2 * | 12/2013 | Foley | A47B 23/046 108/147 |
| 8,661,990 | B2 * | 3/2014 | Crowe | A47B 83/02 108/115 |
| 8,662,324 | B2 * | 3/2014 | Robinson | A47G 23/02 211/126.4 |
| 8,714,569 | B2 * | 5/2014 | Lu | F16M 13/02 280/35 |
| 9,004,137 | B2 * | 4/2015 | Voegeli | B25H 1/0014 157/1.5 |
| 9,073,201 | B1 * | 7/2015 | Foley | B25H 5/00 |
| 2006/0180558 | A1 * | 8/2006 | Engberg | F41B 5/14 211/60.1 |

* cited by examiner

MULTI-USE TOOL TABLES

BACKGROUND

The present disclosure relates generally to rotatable multi-use tool tables (i.e., rotatable multi-use workbenches). In particular, rotatable multi-use tool tables having a supporting column and rotatable plates for attachment of table tools, power tools, other tooling devices, and/or a work pieces are described.

Electrically powered table tools are often used in wood working, metal working, and/or other machine tooling activities. Such devices are often large and require a table or workbench to provide support of the tool and a space for a work piece being worked on by the tool. Tool tables and workbenches can occupy a great deal of space, especially if multiple tools are set up and ready for use. Alternatively, when work space is limited, a limited number of tools can be set up and/or ready for use. In this example, each tool can be taken down or "switched" out for a different tool, which can be cumbersome and can require time for moving the large tools, thereby slowing down the working and/or manufacturing process.

Known tool tables and workbenches are not entirely satisfactory for the range of applications in which they are employed. For example, as described above, existing tool tables and workbenches can have insufficient work surface space for accommodating multiple table tools. In this example, a user must disassemble and/or detach a first tool that is currently set up for operation, move the first tool off the table, move a second tool onto the table, and assemble and/or attach the second tool to the table. This can greatly slow down the working and/or manufacturing process, especially if the user has to switch tools several times during the working and/or manufacturing process. Further, moving of the large tools can require more than one user and/or can cause physical strain to the users.

In another example, existing tool tables and/or workbenches have a large foot print. Therefore, a user must have a large workspace in order to accommodate a tool table and/or workbench. Further, in order to have more than one tool set up and ready for use, a user must have a very large workspace in order to accommodate more than one tool table and/or workbench. Furthermore, conventional tool tables and/or workbenches are stationary and do not allow easy rearrangement of a work space.

Thus, there exists a need for tool tables and/or workbenches that improve upon and advance the design of known tool tables and/or workbenches. Examples of new and useful tool tables and/or workbenches relevant to the needs existing in the field are discussed below.

Disclosure addressing one or more of the identified existing needs is provided in the detailed description below. Examples of references relevant to tool tables and/or workbenches include U.S. Patent References: U.S. Pat. Nos. 2,319,025, 2,851,068, 3,570,564, 4,105,055, 5,431,206, 5,570,641, 5,924,827, 5,957,472, 6,237,659, 6,345,829, 7,089,980, 7,648,155, and 8,539,870. The complete disclosures of the above patents and patent applications are herein incorporated by reference for all purposes.

SUMMARY

The present disclosure is directed to multi-use tool tables configured to support table tools and allow selective rotation of the table tools between an upright position and an inverted position. The multi-use tool tables each include: one or more rotatable plates having a first surface for receiving a first tool and a second opposing surface for receiving a second tool, a perimeter edge of the one or more rotatable plates being attached to a rotatable shaft; a column with a first attached to a support mechanism and a second attached to a sleeve, the sleeve being configured to receive the rotatable shaft; and a stop mechanism configured to selectively resist movement of the rotatable shaft within the sleeve. The one or more rotatable plates are rotatable between a first surface upright/second surface inverted position and a second surface upright/first surface inverted position. In some examples, the support mechanism is a stationary support mechanism. In other examples, the support mechanism is a portable support mechanism.

DETAILED DESCRIPTION

Figure 1:
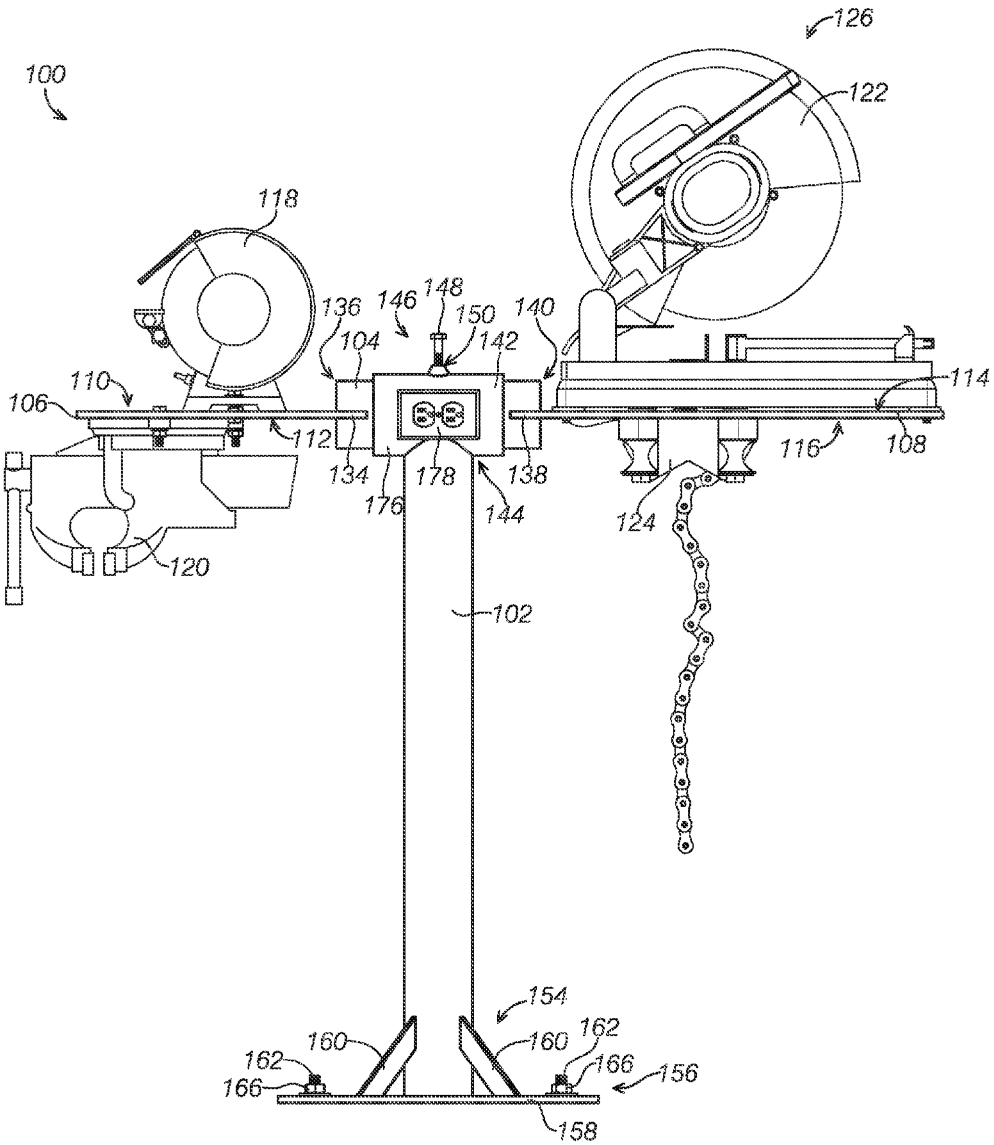
FIG. 1 is a front elevation view of a first example of a multi-use tool table with first and second plates in a first horizontal position.

The disclosed multi-use tool tables will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various multi-use tool tables are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1-14B, first, second, and third examples of a multi-use tool tables, multi-use tool tables 100, 200, and 300, respectively, will now be described. Each of the presently described multi-use tool tables each includes a column, a rotatable shaft, and cooperatively rotatable first and second plates each having first and second surfaces for support and/or attachment of table tools, power tools, and/or work pieces.

The presently described multi-use tool tables are selectively rotatable between first and second horizontal positions. Further, multi-use tool tables 100 and 200 can additionally or alternatively be selectively rotatable into first and second vertical positions. Therefore, using the multi-use tool tables, multiple tools are set up and readily available for use during a working and/or manufacturing process while taking up a minimal amount of workspace. Additionally or alternatively, the third example multi-use tool table is portable and can be used to easily move the table (i.e., work bench) from a first location to a second location within a workspace and/or to a different work space as desired by a user.

Multi-use tool tables 100, 200, and 300 address many of the shortcomings existing with conventional tool tables and/or workbenches. For example, using the presently described multi-use tool tables, one or more tools are readily available and set up for use during a working and/or manufacturing process. Therefore, a user is not required to disassemble, detach, and/or move a first tool and then assemble, attach, and/or move a second tool into place to switch to use of a different tool, as may be required with conventional tool tables. Further, the user can easily switch back and forth between use of different tools during the working and/or manufacturing process, thereby saving the user time and allowing greater flexibility in the working and/or manufacturing process. In another example, the presently described multi-use tool tables have a smaller foot print as compared to conventional tool tables, and require less work space for use. Furthermore, in the example of multi-use tool table 300, the table is portable and allows a user to easily rearrange a work space and/or move the table to a new work space.

Figure 2:
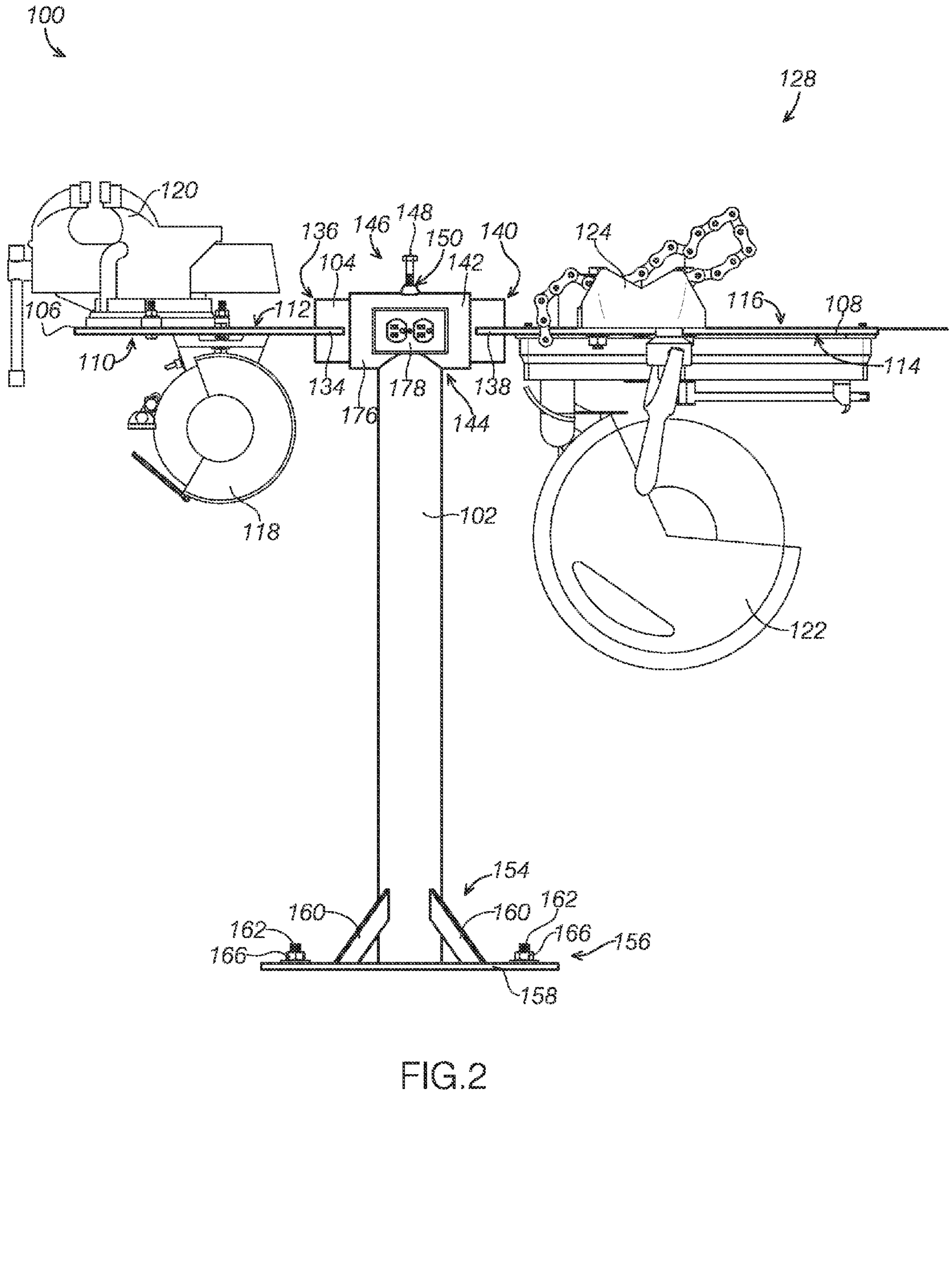
FIG. 2 is a front elevation view of the first example of a multi-use tool table shown in FIG. 1 with first and second plates in a second horizontal position.
Figure 3:
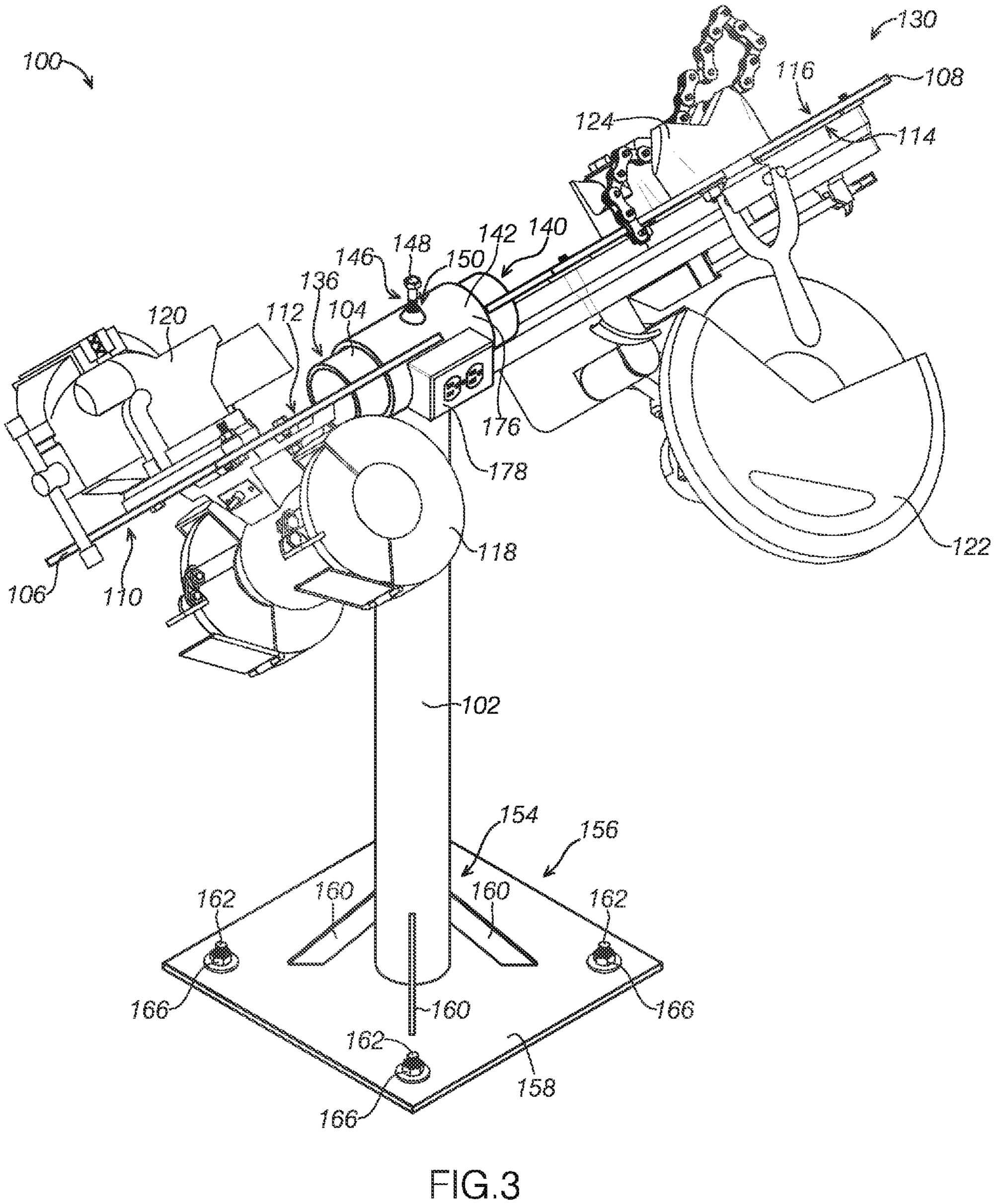
FIG. 3 is a perspective view of the first example of a multi-use tool table shown in FIG. 1 with first and second plates in an intermediate position.

As can be seen in FIGS. 1-3, multi-use tool table 100 includes a column 102, a rotatable shaft 104, a first plate 106, and a second plate 108. First plate 106 includes first surface 110 and second opposing surface 112. Second plate 108 includes first surface 114 and second opposing surface 116. Each of the surfaces (110, 112, 114, and 116) is configured to receive and/or be coupled with a table tool, power tool, and/or work piece. In the present example, tool 118 (i.e., a bench grinder) is attached to surface 110, tool 120 (i.e., a vice) is attached to surface 112, tool 122 (i.e., a chop saw) is attached to surface 114, and tool 124 (i.e., a pipe vice) is attached to surface 116.

It will be appreciated that the various depicted tools can be selectively attached a different one of the surfaces (e.g., tool 118 can be attached to surface 116, tool 124 can be attached to surface 110, etc.). Additionally or alternatively, different types of tools may be attached to one or more of the surfaces. The different types of tools can include but are not limited to drill presses, ban saws, planers, router tables, belt sanders, tile saws, mortising machines, bench top lathes, scroll saws, etc. Further, the various tools may be selectively detached from one or more of the surfaces (i.e., one or more of the surfaces can be "empty"). It will be farther appreciated that in other examples the multi-use tool table can include only one of the first and the second plates.

As shown in FIGS. 1 and 2, plates 104 and 106 of multi-use tool table 100 are rotatable between a first horizontal position 126 (shown in FIG. 1) and a second horizontal position 128 (shown in FIG. 2). FIG. 3 shows plates 104 and 106 in an example intermediate position, intermediate position 130. In other words, FIG. 3 shows plates 104 and 106 being rotated and/or moved between positions 126 and 124. It will be appreciated that in some examples the first and second plates can be rotated 360° around a central axis of the rotatable shaft (i.e., shaft 104). In other examples, the first and second plates can be rotated 180° around a central axis of the rotatable shaft. In both of these examples, it will be further appreciated that the first and second plates can be selectively disposed in various intermediate positions around the central axis of the rotatable shaft.

Returning to FIGS. 1 and 2, in position 126, first plate 106 has first surface 110 in an upright position and second surface 112 in an inverted position, while second plate 108 has first surface 114 in an uptight position and second surface 116 in an inverted position. Thus, in the example of FIG. 1, tools 118 and 122 are in an operable position and tools 120 and 124 are in a generally inoperable position. Further, in position 128, first plate 106 has first surface 110 in an inverted position and second surface 112 in an upright position, while second plate 108 has first surface 114 in an inverted position and second surface 116 in an upright position. Thus, in the example of FIG. 2, tools 120 and 124 are in an operable position and tools 118 and 122 are in a generally inoperable position.

It will be appreciated that in some instances it may be desirable to use a tool in a position other than an upright position. In one example, it may be desirable to use a tool in an inverted position. In this example, an inverted position can be an operable position. In another example, it may be desirable to use a tool in a vertical position (i.e., first and second plates in a vertical position). In this example, the first and second plates can be rotated from either of horizontal positions 126 and 128 into a vertical position 132 (shown in FIG. 4). In this example, the vertical position can be an operable position. It will be further appreciated that in some examples the plates can be rotated and secured in any desired position for operation of a tool (e.g., an angled position, a horizontal position, a vertical position, etc.).

In the present example, first and second plates 106 and 108 are cooperatively rotatable. As shown in FIGS. 1-7 a portion of a perimeter edge 134 of first plate 106 is attached to a first end 136 of shaft 104. A portion of a perimeter edge 138 of second plate 108 is attached to a second end 140 of shaft 104. Therefore, rotation of shaft 104 drives cooperative rotation of first and second plates 106 and 108. Also in the present example, the first and second plates are fixedly attached to the shaft (e.g., welded and/or otherwise permanently attached). It will be appreciated that in alternate examples the first and second plates can be releasably attached to the shaft via a releasable attachment mechanism (e.g., threaded attachment members inserted through complimentary holes, a complimentary flange and groove slide locking mechanism, a spring-biased member locking mechanism, etc.).

Rotatable shaft 104 is disposed within a horizontal sleeve 142 attached to an upper end 144 of column 102. In the present example, an external wall 176 of sleeve 142 includes an electrical outlet 178 for electrical coupling of one or more power tools to provide power to operate the one or more power tools. It will be appreciated the electrical outlet is electrically coupled to a power input cable (not specifically shown) that is further coupled to a power source (e.g., generator, wall power outlet, etc.). In alternate examples, the multi-use tool table can exclude an electrical outlet.

Figure 5:
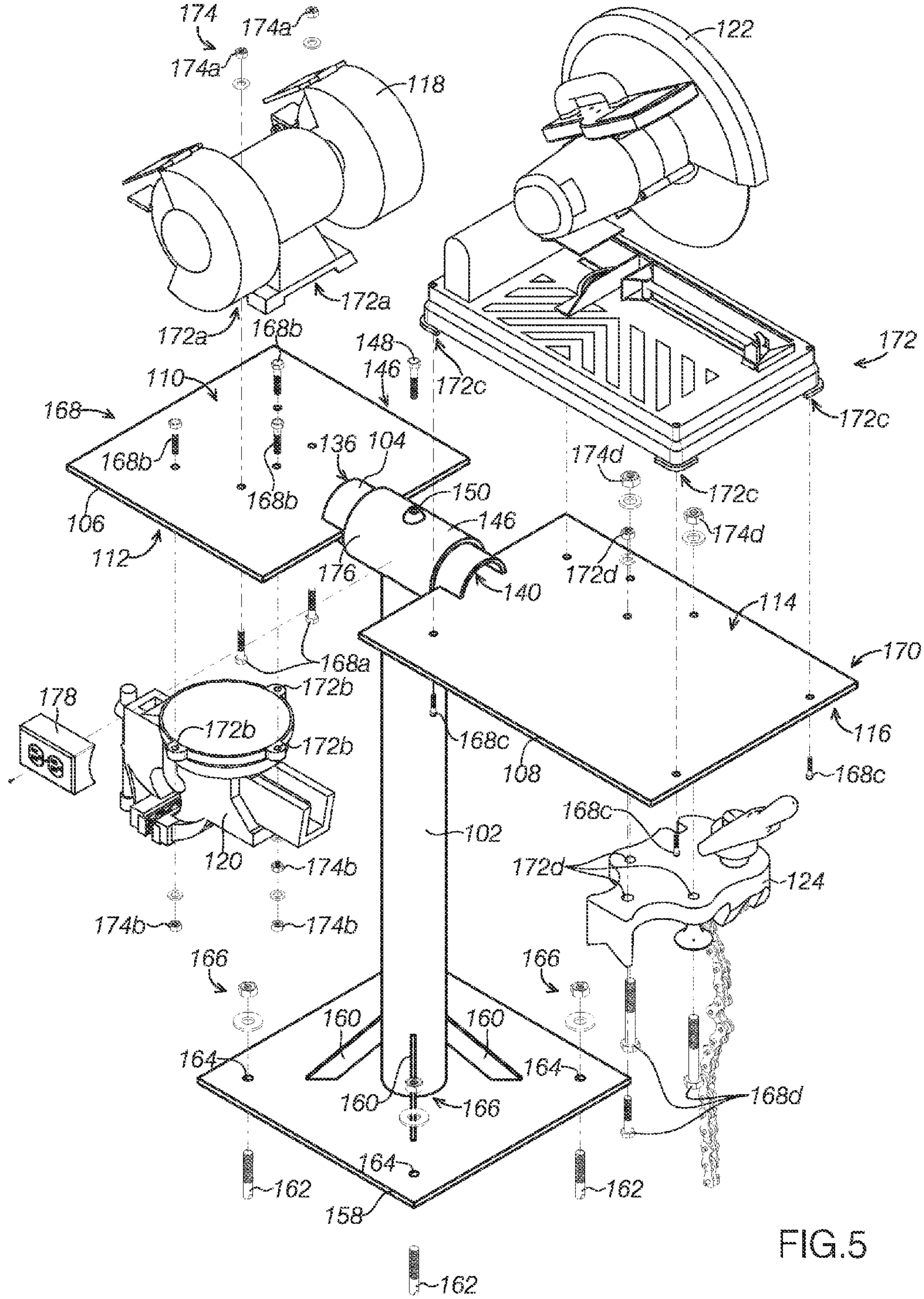
FIG. 5 is an exploded view of the first example of a multi-use tool table shown in FIG. 1.

Shaft 104 is rotatable within sleeve 142. A stopping mechanism 146 is configured to selectively resist movement of rotatable shaft 104 within sleeve 142. In the present example, stopping mechanism 146 includes a locking pin 148 that is selectively insertable through a hole 150 in sleeve 142. FIG. 5 shows an exploded view where locking pin 148 is entirely removed from and/or free of sleeve 142/hole 150. In the present example, locking pin 148 is a bolt that can require a tool for loosening and/or tightening of the bolt. In other examples, the locking pin can have a "T"-shaped hand grip for hand operation.

Figure 6:
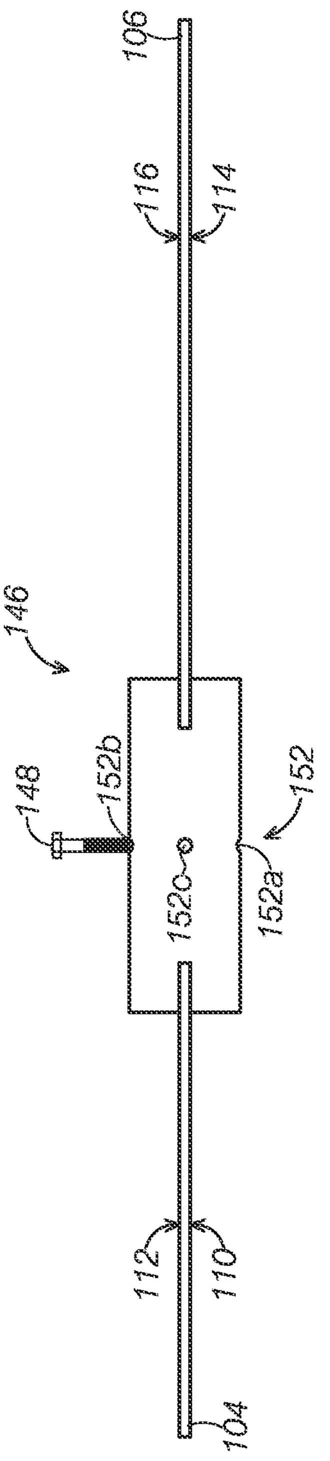
FIG. 6 is a front elevation view of the first and second plates and the rotatable shaft for the first example of a multi-use tool table shown in FIG. 1.

As shown in FIG. 6, shaft 104 includes a plurality of holes 152 that can be aligned with hole 150 for selective insertion of locking pin 148 through the aligned holes. In the example of FIG. 6, holes 152 include a pair of opposing holes **152*a* and 152*b* for locking the first and second plates in position 126 (shown in FIG. 1) and position 128 (shown in FIG. 2), respectively. In the present example, holes 152 further include hole 152*c* for locking the first and second plates in vertical position 132 (shown in FIG. 4**).

It will be appreciated that the rotatable shaft may include any number of holes in any desired location for locking of the first and second plates into a position (e.g., a hole between holes **152*b* and 152*c* for locking the first and second plates in an angled position as depicted position 130 shown in FIG. 3**). Further, in some examples, the locking pin is entirely removed from the sleeve in order to allow rotation of the rotatable shaft. In other examples, the locking pin is only partially removed in order to allow rotation of the rotatable shaft.

In the present example, locking pin 148 is a threaded locking pin and holes 150 and 152 are complimentarily configured threaded holes. Thus, in the present example, stopping mechanism is a threaded engagement mechanism. In alternate examples, the locking pin can have a different engagement mechanism (e.g., a spring-biased locking pin, turnkey-fit locking pin, etc.). In even other alternate examples the rotatable shaft may include an alternately configured stop mechanism (e.g., a slideable flange locking mechanism, a magnetic locking mechanism, etc.). It will be appreciated that any known or yet to be discovered locking mechanism can be used to resist movement of the rotatable shaft and the plates.

Returning to FIG. 5, each of the tools is attached to the first and second plates via a plurality of tool attachment members 168. Specifically, attachment members **168*a* (including two attachment members) are configured to attach tool 118 to surface 110, attachment members 168*b* (including three attachment members) are configured to attach tool 120 to surface 112, attachment members 168*c* (including four attachment members, although only three are shown in FIG. 5) are configured to attach tool 122 to surface 114, and attachment members 168*d* (including three attachment members) are configured to attach tool 124 to surface 116. It will be appreciated that alternate examples the various sets of tool attachment members (e.g., 168*a*, 168*b*, 168*c*, and 168*d***) can include more or fewer attachment members.

Figure 7:
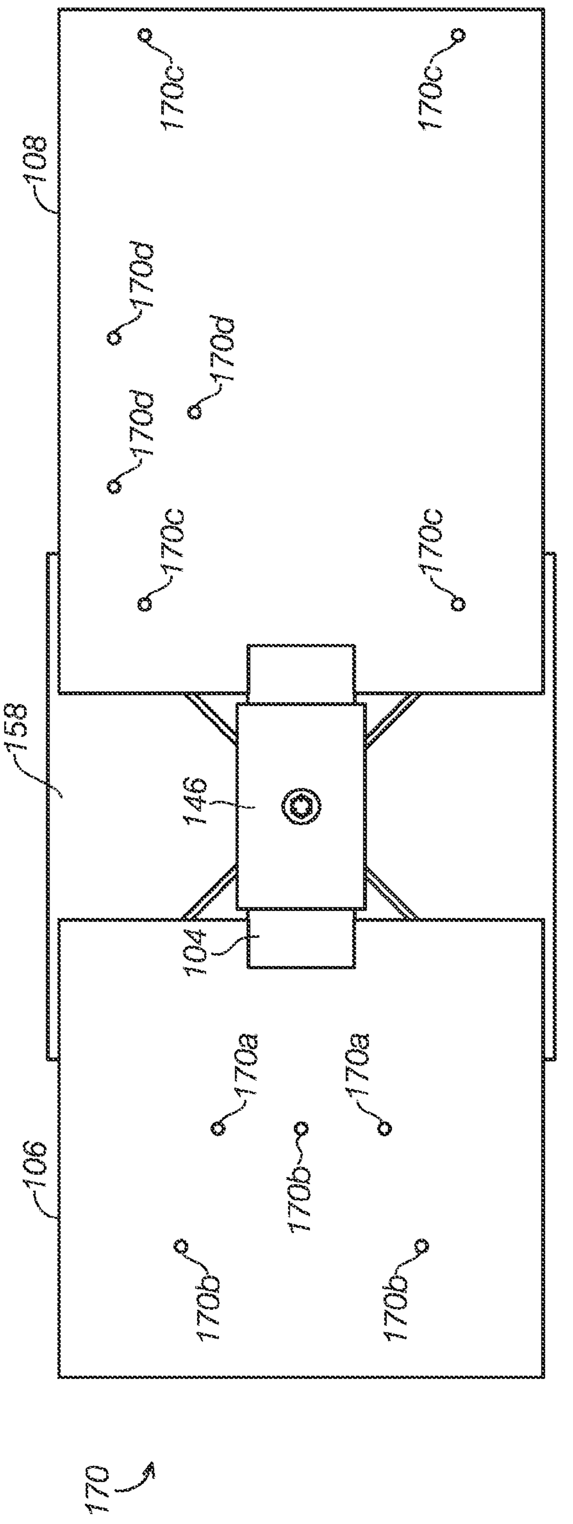
FIG. 7 is a top plan view of the first and second plates, the rotatable shaft, and the column for the first example of a multi-use tool table shown in FIG. 1.
Figure 8:
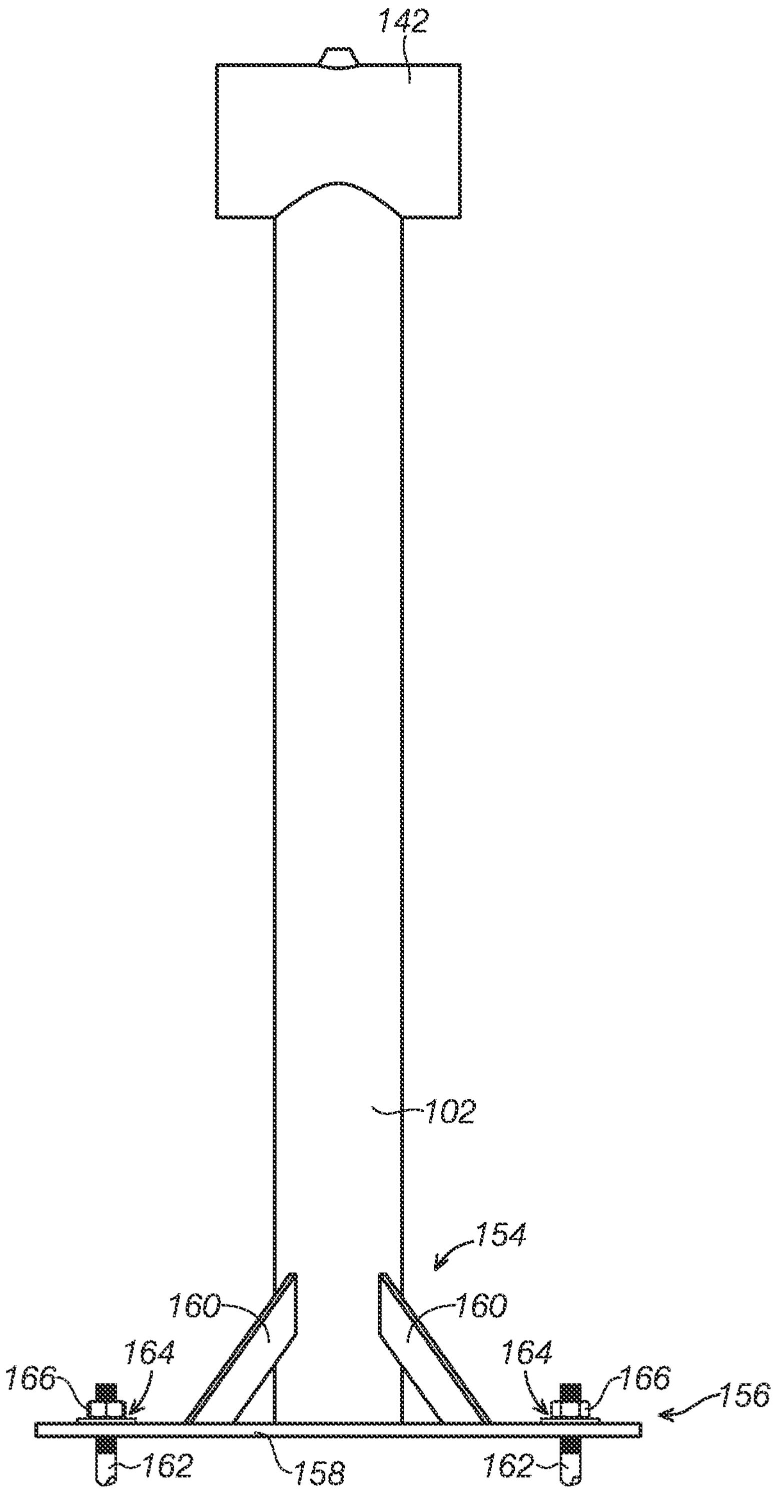
FIG. 8 is a front elevation view of the column for the first example of a multi-use tool table shown in FIG. 1.

Each of tool attachment members 168 is configured to be inserted through a hole in one of the first or the second plates (i.e., one of plurality of holes 170). As shown in FIGS. 5 and 7, holes **170*a* are configured to receive attachment members 168*a*, holes 170*b* are configured to receive attachment members 168*b*, holes 170*c* are configured to receive attachment members 168*c*, and holes 170*d* are configured to receive attachment members 168*d***. It will be appreciated that in alternate examples where the sets of tool attachment members include more or fewer attachment members, the corresponding set of holes in the first or second plate can have a corresponding number of holes.

As depicted in FIG. 5, each of the tools include tool holes 172 that are configured to receive an end of each of tool attachment members 168 that projects through holes 170 in the first and second plates. Specifically, holes **172*a* are configured to receive attachment members 168*a*, holes 172*b* are configured to receive attachment members 168*b*, holes 172*c* are configured to receive attachment members 168*c*, and holes 172*d* are configured to receive holes 168*d***. It will be appreciated that in alternate examples where the sets of tool attachment members include more or fewer attachment members, the corresponding set of holes in the each of the tools can have a corresponding number of holes.

Also depicted in FIG. 5, each of attachment members 168 can be secured by a securing member 174 (e.g., **174*a*, 174*b*, and 174*d* configured to secure attachment members 168*a*, 168*b*, and 168*c*, respectively). In the present example, attachment members 168*c* for attaching tool 122 to surface 114** do not include securing members. It will be appreciated that in alternate examples where the sets of tool attachment members include more or fewer attachment members, the corresponding set of securing members for each tool can include a corresponding number securing members. Further, it will be appreciated that the multi-use tool table can include or exclude securing members as is desired and/or required for securing the attachment members.

In the present example, each of the attachment members is a threaded attachment member, and plate holes, tool holes, and securing members can be complimentarily configured to receive the threaded attachment members. It will be appreciated that the threaded attachment members allow the tools to be releasably attached to the surfaces of the plates. In alternate examples, the tools can be permanently fixed to the plates (e.g., the tools can be welded to the plates). Further, in some other alternate examples, the sets of holes in the plates for tool attachment and the corresponding holes in the tools are standardized such that any tool can be attached to any desired surface of the multi-use tool table.

Returning to FIGS. 1-5 and as described above, sleeve 142 is disposed at upper end 144 of column 102. Column 102 is a vertical column and has a lower end 154 opposing upper end 144. Lower end 154 includes a support mechanism 156. In the example of multi-use tool table 100, support mechanism 156 is configured to anchor the multi-use tool table to a floor of a work space. Accordingly, support mechanism 156 is characterized as a "stationary" support mechanism.

Figure 4:
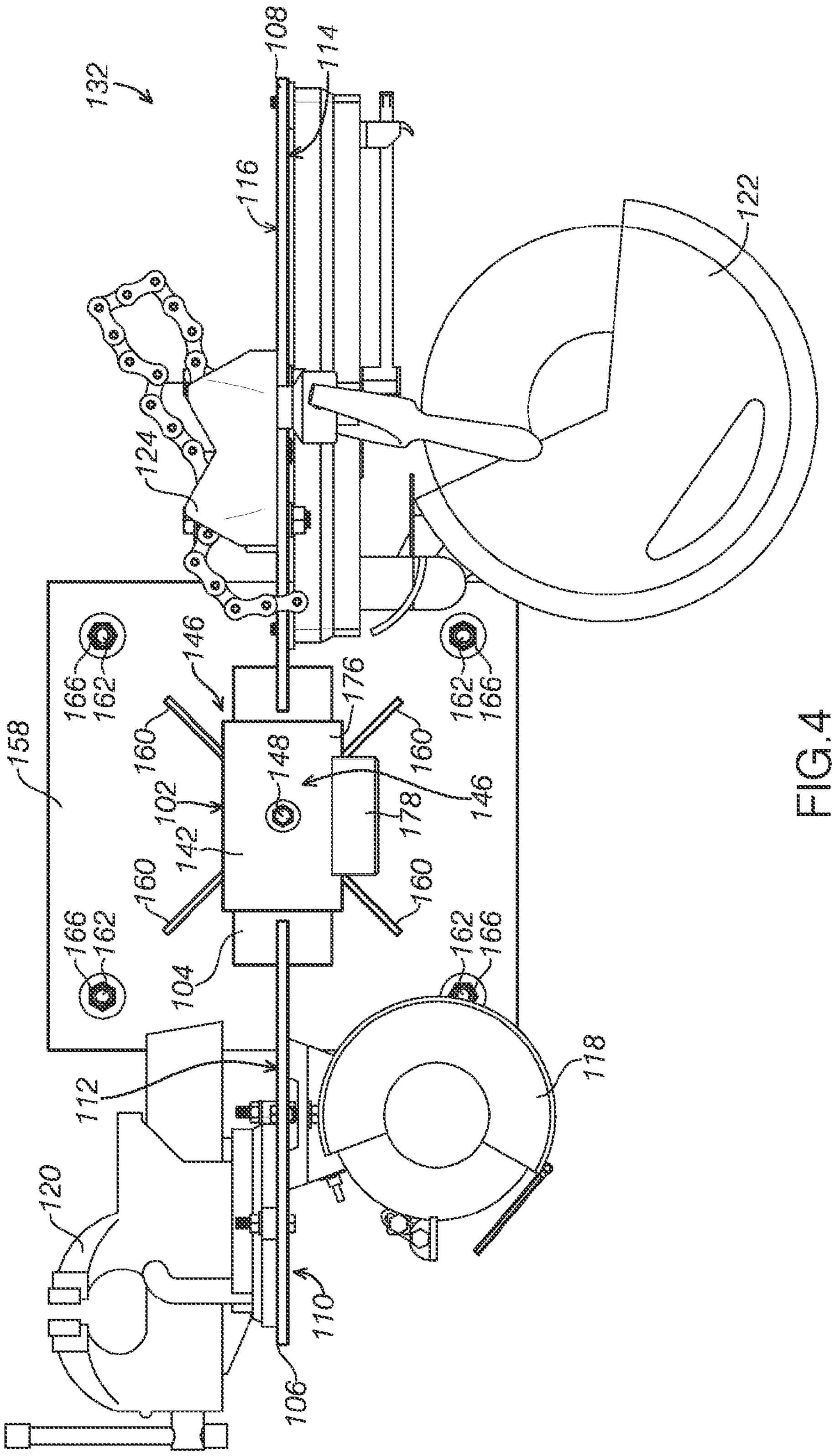
FIG. 4 is a top plan view of the first example of a multi-use tool table shown FIG. 1 with first and second plates in a vertical position.
Figure 9:
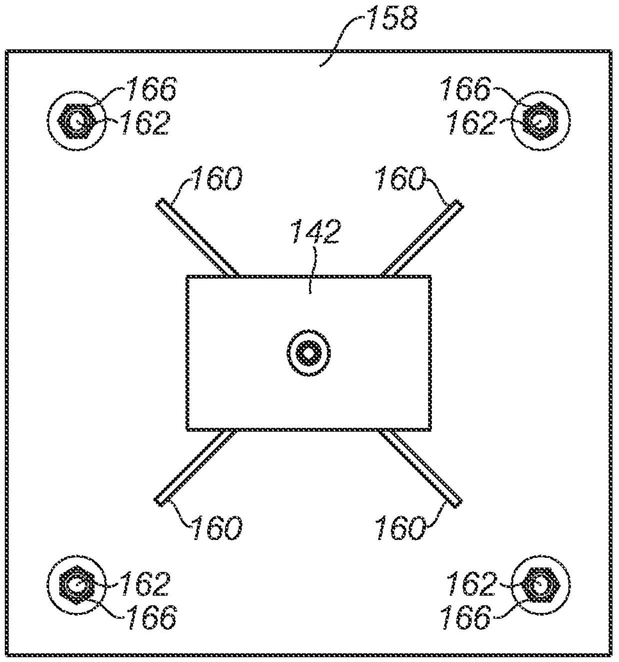
FIG. 9 is a top plan view of the column for the first example of a multi-use tool table shown in FIG. 1.

Specifically, support mechanism 156 includes a base plate 158, angled support members 160, and attachment members 162. As shown in FIGS. 1, 2, and 5, support members 160 are disposed at an angle between base plate 158 and column 102, thereby being configured to support column 102. As shown in FIGS. 4 and 9, support members 160 includes four support members. In alternate example, the support mechanism can include more or fewer support members.

Also shown in FIGS. 4 and 9, attachment members 162 include four attachment members each attached to one corner of base plate 158. As depicted in FIGS. 5 and 7, attachment members 162 are disposed below base plate 158 and are configured to be embedded in a ground surface (e,g., embedded in a cement floor) and project upwardly from the ground surface through holes 164 in base plate 158. Securing members 166 are fitted over exposed ends of attachment members 162 to secure base plate 158 to attachment members 162. In the present example, attachment members 162 are threaded attachment members and securing members 166 are complimentarily configured threaded securing members.

In the present example, multi-use tool table 100 can be selectively detached from the ground surface by releasing securing members 166 from attachment members 162 and removing base plate 158 from attachment members 162. In alternate examples, the base plate and/or the bottom end of the column can be fixedly secured directly to a surface (e.g., welded directly to a metallic surface). Further, in the present example the base plate and the support members are fixedly attached to column 102 (e.g., the base plate and the support members are welded to the column. In alternate examples, the support mechanism can have a releasably attached base plate and/or support members (e.g., support mechanism 256 shown in FIGS. 10A and 10B).

Figure 10A:
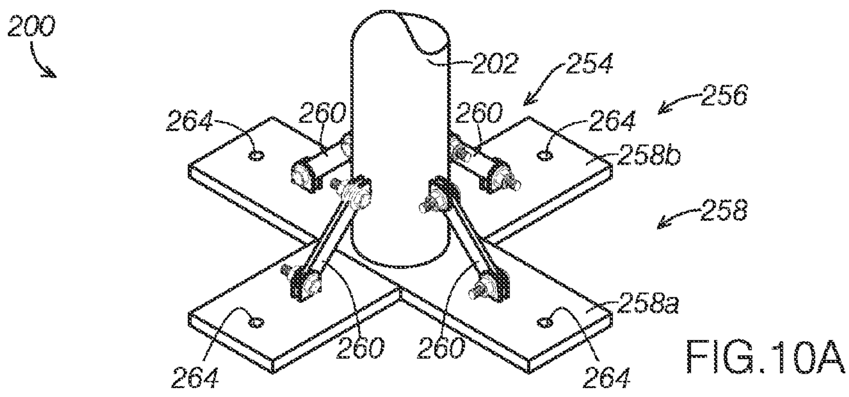
FIGS. 10A and 10B are perspective and exploded views, respectively, of a second example of a multi-use tool table.
Figure 10B:
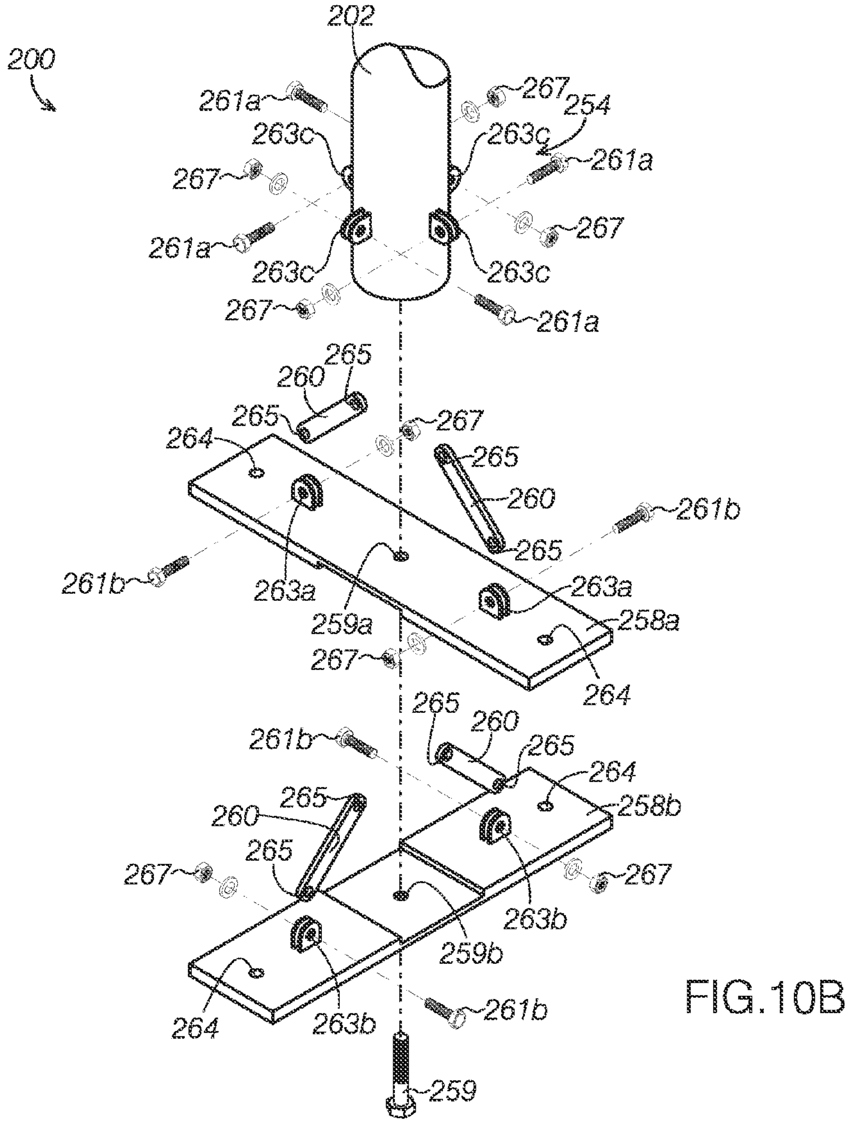

Turning attention to FIGS. 10A and 10B, a second example of a multi-use tool table, multi-use tool table 200, will now be described. Multi-use tool table 200 includes many similar or identical features to multi-use tool table 100. Thus, for the sake of brevity, each feature of multi-use tool table 200 will not be redundantly explained and/or shown in the figures. Rather, key distinctions between multi-use tool table 200 and multi-use tool table 100 will be described in detail and the reader should reference the discussion above for features substantially similar between the two multi-use tool tables.

Specifically, FIGS. 10A and 10B depict only a portion of multi-use tool table 200 (i.e., an alternative configuration for a support mechanism that can be used with a multi-use tool table). It will be appreciated that other features (e.g., upper end of the column, the sleeve, the rotatable shaft, the stop mechanism, the first and second plates, etc.) of multi-use tool table 200 are identical to the features of multi-use tool table 100. Therefore, the description above in reference to other features (e.g., upper end of the column, the sleeve, the rotatable shaft, the stop mechanism, the first and second plates, etc.) of multi-use tool table 100 also applies to multi-use tool table 200.

As shown in FIGS. 10A and 10B, a column 202 includes a support mechanism 256 at a bottom end 254 of the column. In this example, two interlocking base plate pieces 258*a* and 258*b* are fitted together to form a base 258. Base 258 is attached to column 202 via an attachment member 259 that is insertable through aligned holes 259*a* and 259*b* in interlocking base plate pieces 258*a* and 258*b* and a central hole in column 202 (not specifically shown). In the present example, attachment member 259 is a threaded attachment member and holes 259*a*, 259*b*, and/or the central hole of the column can be complimentarily configured threaded holes. Thus, base 258 can be selectively and releasably attached to column 202. Base 258 includes holes 264 where attachment members can be inserted for attachment of the base to a ground surface (e.g., attachment to attachment members embedded in cement). Thus, similar to support mechanism 156, support mechanism 256 is a "stationary" support mechanism.

Further, in the example shown in FIGS. 10A and 10B, each of support members 260 are attached to multi-use tool table 200 via attachment members 261. More specifically, holes 265 at opposing ends of each support member are attached to column 202 via attachment members 261*a* and attached to base 258 via attachment members 261*b*. Further, base plate piece 258*a* includes attachment fixtures 263*a* and base plate piece 258*b* includes attachment fixtures 263*b* for releasable attachment of attachment members 261*b*, and an outer surface of column 202 includes attachment fixtures 263*c* for releasable attachment of attachment members 261*a*. Securing members 267 are fitted over exposed ends of attachment members 261 to secure attachment of the support members to the column and the base. In the present example, attachment members 261 are threaded attachment members and securing members 267 are complimentarily configured threaded securing members. Thus, support members 260 can be selectively and releasable attached to column 202 and/or base 258.

Turning attention to FIGS. 11-14B, a third example of a multi-use tool table, multi-use tool table 300, will now be described. Multi-use tool table 300 includes many similar or identical features to multi-use tool tables 100 and 200. Thus, for the sake of brevity, each feature of multi-use tool table 300 will not be redundantly explained and/or shown in the figures. Rather, key distinctions between multi-use tool table 300 and multi-use tool tables 100 and 200 will be described in detail and the reader should reference the discussion above for features substantially similar between the multi-use tool tables.

Specifically, FIGS. 11-14B depict only a portion of multi-use tool table 300 (i.e., an alternative configuration for a support mechanism and a column that can be used with a multi-use tool table). It will be appreciated that other features (e.g., the rotatable shaft, the stop mechanism, the first and second plates, etc.) of multi-use tool table 300 are identical to the features of multi-use tool table 100. Therefore, the description above in reference to other features (e.g., the rotatable shaft, the stop mechanism, the first and second plates, etc.) of multi-use tool table 100 also applies to multi-use tool table 300.

Figure 11:
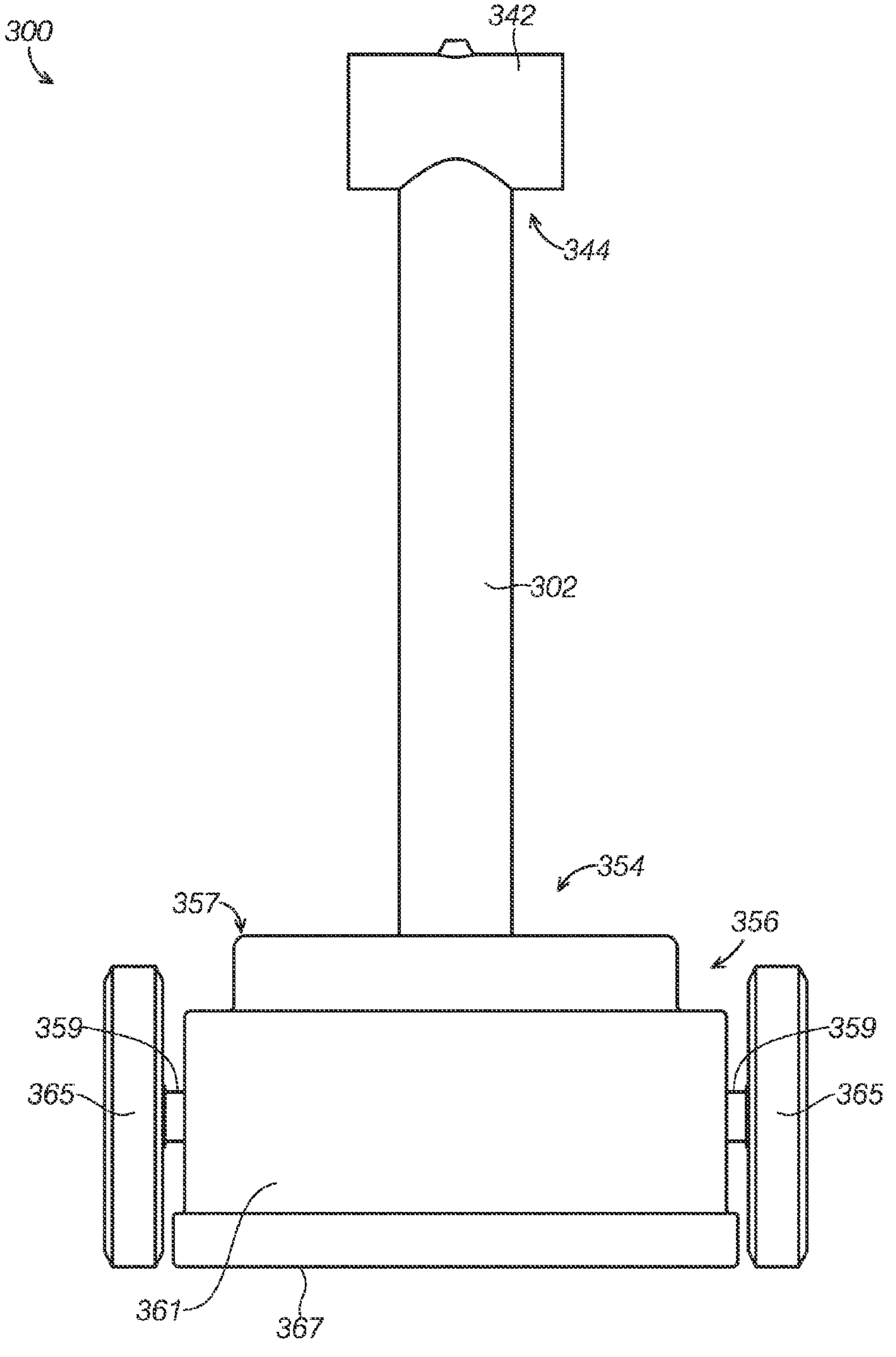
FIG. 11 is a front elevation view of a third example of a multi-use tool table.
Figure 12:
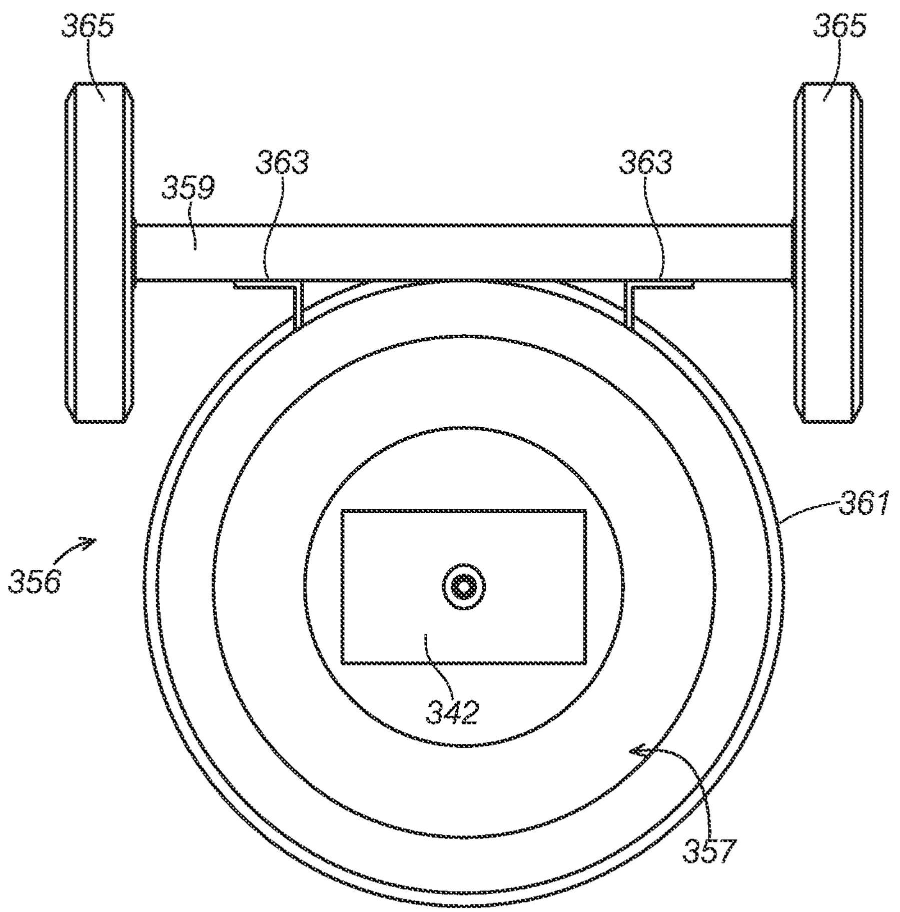
FIG. 12 is a top plan view of the third example of a multi-use tool table shown in FIG. 11.
Figure 13B:
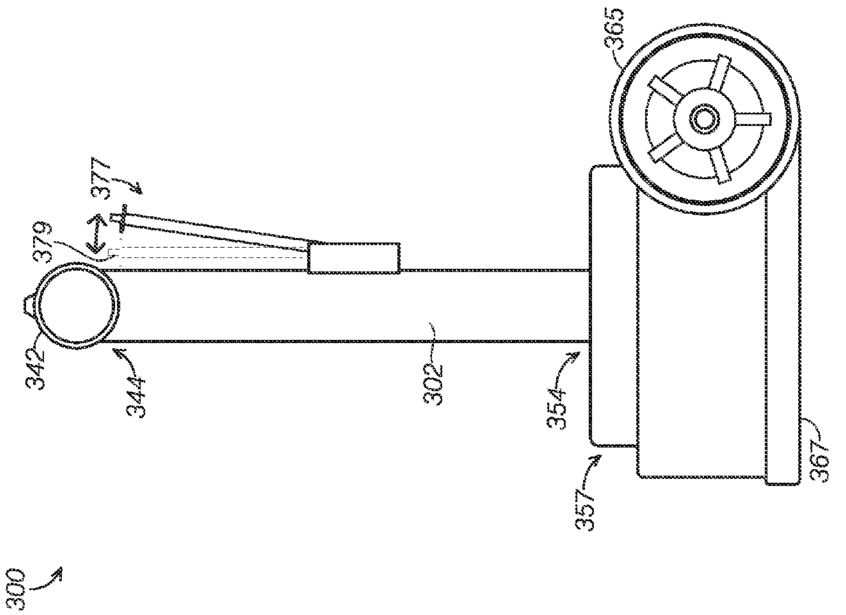
FIGS. 13A and 13B are side elevation views of a first example handle for the third example of a multi-use tool table shown in FIG. 11.
Figure 13A:
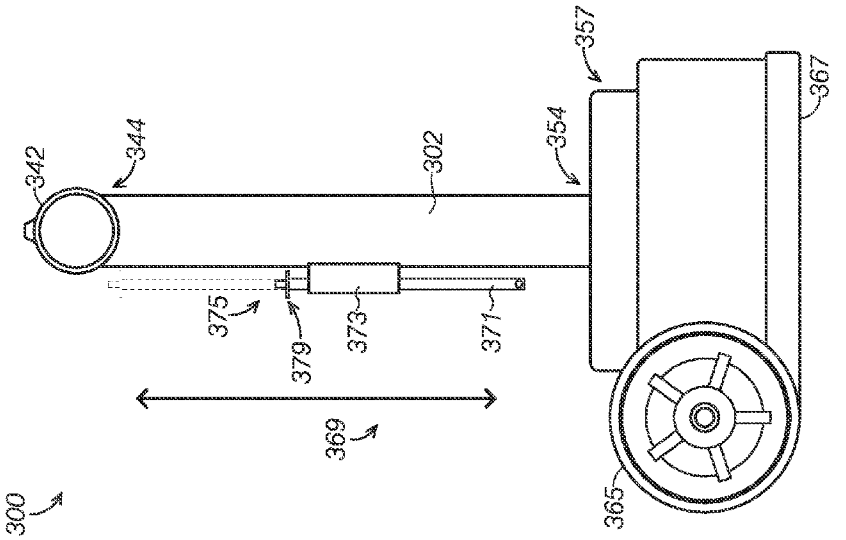

As shown in FIGS. 11 and 12, multi-use tool table 300 includes a column 302 having an upper end 344 that is a location of attachment to a sleeve 342 and a lower end 354 that is a location of attachment to a support mechanism 356. Support mechanism 356 includes a base 357 having a generally stepped cylindrical configuration. Base 357 is comprised of a heavy material and/or includes an internal chamber that is weighted with a heavy material. In one specific example, is a steel drum (e.g., a brake drum from a semi-truck). In other examples, the base can be comprised of a steel drum filled with cement, sand, water, and/or any other suitably weighted material known or yet to be discovered. Additionally or alternatively, the base can have a different shape (e.g., squared, non-stepped cylindrical, pyramidal, etc.). A bottom wall 367 of base 357 is configured to rest on and be abutted to a ground surface (e.g., floor of a work space).

A cross bar 359 is attached to an outer wall 361 of base 357. Further, two L-shaped supports 363 are attached to outer wall 361 and cross bar 359. In the present example, cross bar 359 and supports 363 are fixedly attached (e.g., welded) to outer wall 361 and supports 363 are fixedly attached (e.g., welded) to cross bar 359. In alternate examples, one or more of the cross bar and the supports can be releasably attached to the outer wall and/or the supports can be releasably attached (e.g., attached via attachment members) to the cross bar.

Wheels 365 are rotatably attached to opposing ends of cross bar 359. In operation, multi-use tool table 300 can be tipped so that bottom wall 367 is lifted away from the ground surface and the weight of multi-use tool table 300 generally rests on wheels 365. Multi-use tool table 300 is configured to be "rolled" from a first location to a second location. Thus, support mechanism 356 is characterized as a "mobile" and/or "portable" support mechanism.

In some examples, a handle can be useful for steering multi-use tool table 300 during movement from one location to another location. A handle can be disposed on the column and/or the sleeve. In one specific example shown in FIGS. 13A and 13B, a handle 369 is attached to column 302. Handle 369 includes a slidable bar 371 and a handle anchor 373. Handle 369 is moveable between an inoperable position 375 (shown in FIG. 13A) and an operable position 377 (shown in FIG. 13B).

In inoperable position 375, slidable bar 371 is in a downward position so that a hand grip 379 is proximal to handle anchor 373. To move handle 369 into operable position 377, hand grip 379 is pulled upward so that slideable bar 371 is slid upward through handle anchor 373 (i.e., hand grip 379 is moved so that it is distal relative to handle anchor 373). Bar 371 is then moved outwardly, away from column 302 via a pivotable locking mechanism (not specifically shown). It will be appreciated that the handle can be moved into the inoperable position during use of the various table tools and moved into the operable position during transport of the multi-use tool table from one location to another location.

Figure 14A:
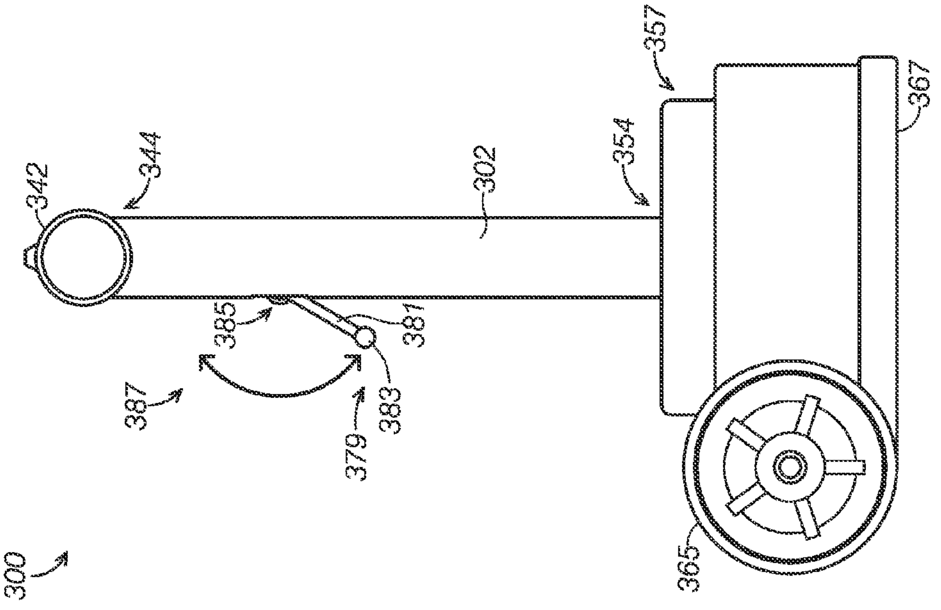
FIGS. 14A and 14B are side elevation views of a second example handle for the third example of a multi-use tool table shown in FIG. 11.
Figure 14B:
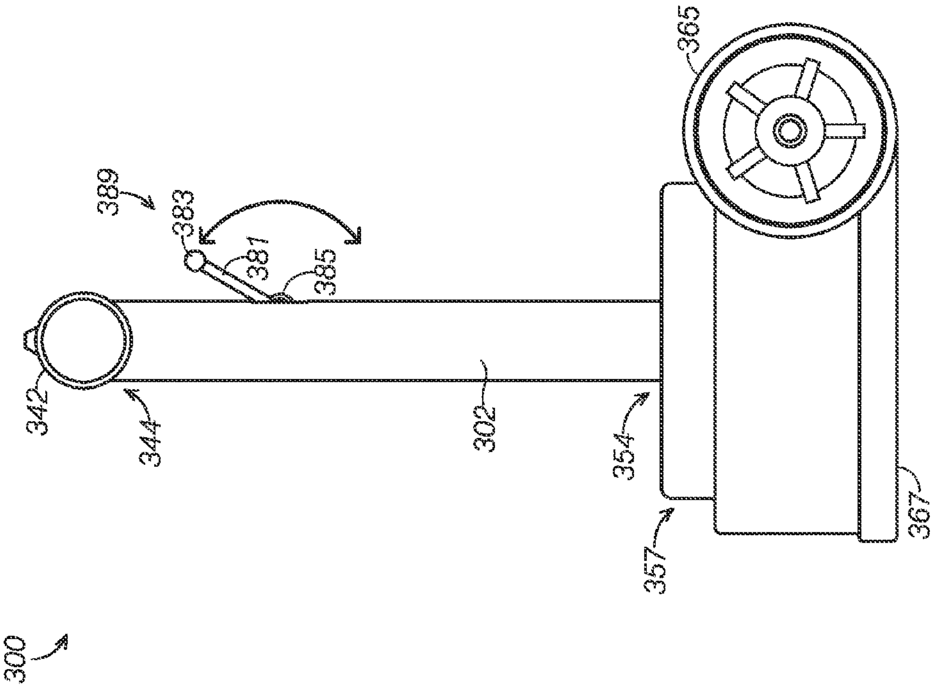

FIGS. 14A and 14B show a second example of a handle, handle 379, that can be used with multi-use tool table 300. In this example, handle 379 includes are pivotable bar 381 with a hand grip 383 and a handle anchor 385. The handle anchor is a pivotable attachment point on the column for the pivotable bar. Handle 383 is moveable between an inoperable position 387 (shown in FIG. 14A) and an operable position 389 (shown in FIG. 14B).

In inoperable position 387, pivotable bar 381 is in a generally downward angled position and hand grip 383 is proximal to lower end 354 of column 302. To move handle 379 into operable position 389, hand grip 383 is pulled upward so that pivotable bar 381 is pivoted upward around handle anchor 385 (i.e., hand grip 383 moved to a position proximal to upper end 344 of column 3020). It will be appreciated that the handle can be moved into the inoperable position during use of the various table tools and moved into the operable position during transport of the multi-use tool table from one location to another location.

It will be appreciated that for each of the above described multi-use tool tables, the various components (i.e., first and second plates, shaft, sleeve, column, and support mechanism) are comprised of a heavy height metallic material. In one specific example, the components are comprised of steel. In alternate examples the components can be comprised one or more other suitable materials. Examples of other materials can include but are not limited to heavy gauge aluminum, dense plastic, carbon fiber, etc. Further, in some alternate examples, the multi-use tool tables can include additional features. For example, the column can include a system (e.g., a hydraulic system, a manual crank system, etc.) for raising and lowering a height of the first and second plates. In another example, the first and second plates can have extension plates that can be added to adapt the plates for use with specific tools (e.g., a wood guide for use with a circular saw). In even another example, the first and second plates can be attached to separate rotatable shafts within the sleeve so that the first and second plates are independently rotatable.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A multi-use tool table configured to support one or more table tools and allow selective rotation of the one or more table tools between an upright position and an inverted position, the multi-use tool table comprising:

at least one rotatable plate having a first surface and a second surface, the first surface being configured to receive a first table tool and the second surface being configured to receive a second table tool, the first surface being on an opposing side of the first rotatable plate relative to the second surface, at least a portion of a perimeter edge of the at least one rotatable plate being attached to a rotatable shaft;

a column with a first column end and a second column end, the first column end being attached to a support mechanism and the second column end being attached to a sleeve, the sleeve being configured to receive the rotatable shaft;

a stop mechanism configured to selectively resist movement of the rotatable shaft within the sleeve, the stop mechanism having a first through hole in the sleeve, a second through hole in the rotatable shaft, a third through hole in the rotatable shaft, the second through hole being on an opposing side of the shaft relative to the third through hole, each of the second through hole and the third through hole be alternately and selectively alignable with the first through hole, the stop mechanism further comprising a locking pin, each of the second through hole and the third through hole being configured to receive the locking pin when aligned with the first through hole; and wherein the at least one rotatable plate is rotatable between a first surface upright/second surface inverted position and a second surface upright/first surface inverted position.

2. The multi-use tool table of claim 1, wherein the rotatable shaft has a first shaft end and a second shaft end, the first shaft end opposing the second shaft end, and the at least one rotatable plate comprises a first rotatable plate attached to the first shaft end and a second rotatable plate attached to the second shaft end, the first rotatable plate and the second rotatable plate being cooperatively rotatable.

3. The multi-use tool table of claim 2, wherein the first rotatable plate and the second rotatable plate are cooperatively rotatable between a first and third surfaces upright/ second and fourth surfaces inverted position and a second and fourth surfaces upright/first and third surfaces inverted position.

4. The multi-use tool table of claim 2, wherein the first rotatable plate has the first surface and the second surface, and the second rotatable plate has a third surface and a fourth surface, the third surface being configured to receive a third table tool and the fourth surface being configured to receive a fourth table tool, the third surface being an opposing side of the second rotatable plate relative to the fourth surface.

5. The multi-use tool table of claim 1, wherein the locking pin is a threaded pin and each of the first through hole, the second through hole, and the third through hole are complimentarily configured to the threaded pin.

6. The multi-use tool table of claim 1, wherein the support mechanism comprises a stationary support mechanism.

7. The multi-use tool table of claim 6, wherein the stationary support mechanism comprises a base plate, at least two support members disposed at an angle between the base plate and the column, at least two bolts configured to attach the base plate to a solid surface.

8. The multi-use tool table of claim 1, wherein the at least one rotatable plate is further rotatable between the first surface upright/second surface inverted position, the second surface upright/first surface inverted position, and a vertical position, the first surface upright/second surface inverted position and the second surface upright/first surface inverted position being horizontal positions.

9. A multi-use table comprising:

at least one rotatable plate having a first surface and a second surface, the first surface being on an opposing side of the first rotatable plate relative to the second surface, at least a portion of a perimeter edge of the at least one rotatable plate being attached to a rotatable shaft;

a column with a first column end and a second column end, the first column end being attached to a support mechanism and the second column end being attached to a sleeve, the sleeve being configured to receive the rotatable shaft;

a stop mechanism configured to selectively resist movement of the rotatable shaft within the sleeve, wherein the stop mechanism comprises a first through hole in the sleeve, a second through hole in the rotatable shaft, a third through hole in the rotatable shaft, the second through hole being on an opposing side of the shaft relative to the third through hole, each of the second through hole and the third through hole be alternately selectively alignable with the first through hole, the stop mechanism having a locking pin, each of the second through hole and the third through hole being configured to receive the locking pin when aligned with the first through hole; and wherein the at least one rotatable plate is rotatable between a first surface upright/second surface inverted position and a second surface upright/first surface inverted position.

10. The multi-use table of claim 9, wherein the rotatable shaft has a first shaft end and a second shaft end, the first shaft end opposing the second shaft end, and the at least one rotatable plate comprises a first rotatable plate attached to the first shaft end and a second rotatable plate attached to the second shaft end.

11. The multi-use table of claim 10, wherein the first rotatable plate has the first surface and the second surface, and the second rotatable plate has a third surface and a fourth surface, the third surface being an opposing side of the second rotatable plate relative to the fourth surface.

12. The multi-use table of claim 11, wherein the first surface is configured to receive a first table tool, the second surface is configured to receive a second table tool, the third surface is configured to receive and third table tool, and the fourth surface is configured to receive a fourth table tool.

13. The multi-use table of claim 9, wherein the first surface is configured to receive a first table tool and the second surface is configured to receive a second table tool.

14. The multi-use table of claim 9, wherein the support mechanism comprises a stationary support mechanism having a platform, at least two supporting beams disposed at an angle between the platform and the column, at least two bolts configured to attach the platform to a solid surface.

15. A multi-use tool table configured to support one or more table tools and allow selective rotation of the one or more table tools into an operable position and an inoperable position, the multi-use tool table comprising:

a first rotatable plate having a first surface and a second surface, the first surface being configured to receive a first table tool and the second surface being configured to receive a second table tool, the first surface being on an opposing side of the first rotatable plate relative to the second surface, at least a portion of a perimeter edge of the first rotatable plate being attached to a first shaft end of a rotatable shaft;

a second rotatable plate having a third surface and a fourth surface, the third surface being configured to receive a first table tool and the fourth surface being configured to receive a second table tool, the third surface being on an opposing side of the second rotatable plate relative to the fourth surface, at least a portion of a perimeter edge of the second rotatable plate being attached to a second shaft end of the rotatable shaft, the second shaft end opposing the first shaft end;

a column with a first column end and a second column end, the first column end being attached to a support mechanism and the second column end being attached to a sleeve, the sleeve being configured to receive the rotatable shaft; and a stop mechanism configured to selectively resist movement of the rotatable shaft within the sleeve, the stop mechanism having a first through hole in the sleeve, a second through hole in the rotatable shaft, a third through hole in the rotatable shaft, the second through hole being on an opposing side of the shaft relative to the third through hole, each of the second through hole and the third through hole be alternately and selectively alignable with the first through hole, the stop mechanism further comprising a locking pin, each of the second through hole and the third through hole being configured to receive the locking pin when aligned with the first through hole; wherein the first rotatable plate and the second rotatable plate are configured to be cooperatively rotatable, and the first rotatable plate and the second rotatable plate are rotatable between a first and third surfaces upright/second and fourth surfaces inverted position and a second and fourth surfaces upright/ first and third surfaces inverted position.

16. The multi-use tool table of claim 15, wherein the first rotatable plate and the second rotatable plate being cooperatively rotatable.

17. The multi-use tool table of claim 16, wherein the first rotatable plate and the second rotatable plate are cooperatively rotatable between a first and third surfaces upright/second and fourth surfaces inverted position and a second and fourth surfaces upright/first and third surfaces inverted position.

18. The multi-use tool table of claim 15, wherein the third surface is configured to receive a third table tool and the fourth surface being configured to receive a fourth table tool, the third surface being an opposing side of the second rotatable plate relative to the fourth surface.

19. The multi-use tool table of claim 15, wherein the locking pin is a threaded pin and each of the first through hole, the second through hole, and the third through hole are complimentarily configured to the threaded pin.

20. The multi-use tool table of claim 15, wherein the support mechanism comprises a stationary support mechanism having a base plate, at least two support members disposed at an angle between the base plate and the column, at least two bolts configured to attach the base plate to a solid surface.

* * * * *